(12) United States Patent
Tjahjadi et al.

(10) Patent No.: US 11,909,655 B1
(45) Date of Patent: Feb. 20, 2024

(54) SYSTEMS AND METHODS FOR SELECTIVE DEPLOYMENT OF EXPERIMENTAL CONFIGURATIONS TO MUTUALLY EXCLUSIVE GROUPS

(71) Applicant: COUPANG CORP., Seoul (KR)

(72) Inventors: Aldi Tjahjadi, Mountain View, CA (US); ZhaoPing Yan, Mountain View, CA (US); Ngoc-Lan Isabelle Phan, Burlingame, CA (US); Jean-Baptiste Rieu, Paris (FR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 17/883,922

(22) Filed: Aug. 9, 2022

(51) Int. Cl.
*H04L 47/2475* (2022.01)
*H04L 47/62* (2022.01)

(52) U.S. Cl.
CPC ...... *H04L 47/2475* (2013.01); *H04L 47/6215* (2013.01)

(58) Field of Classification Search
None
See application file for complete search history.

(56) References Cited

U.S. PATENT DOCUMENTS

| 9,881,318 B1* | 1/2018 | Krishnamoorthy ........................ G06Q 30/0246 |
| 11,586,847 B1* | 2/2023 | Thomas ................ G06F 16/164 |

| 2012/0047430 A1* | 2/2012 | Williams ............... G06Q 30/02 715/239 |
| 2013/0030868 A1* | 1/2013 | Lyon .................. G06Q 30/0236 705/7.29 |
| 2013/0268841 A1* | 10/2013 | Kummer ............... G06F 40/143 715/234 |

(Continued)

FOREIGN PATENT DOCUMENTS

| CN | 104281611 A | 1/2015 |
| CN | 103324566 B | 4/2016 |

OTHER PUBLICATIONS

International Search Report and Written Opinion for counterpart application No. PCT/IB2023/055438 dated Sep. 18, 2023, (10 pages).

*Primary Examiner* — Jonathan A Bui
(74) *Attorney, Agent, or Firm* — FINNEGAN, HENDERSON, FARABOW, GARRETT & DUNNER, LLP

(57) ABSTRACT

Computer-implemented systems and methods for selective deployment of experimental configurations are disclosed The systems and methods may include performing steps of deploying a webpage comprising a plurality of configurations, wherein the plurality of configurations exhibit different behaviors; configuring a traffic container comprising a first bucket and a second bucket based on user input; assigning one or more experiments to the traffic container based on the user input, wherein the one or more experiments determine appropriate configurations for the first bucket and the second bucket; accepting incoming traffic for accessing the webpage; randomly assigning a first subset of the incoming traffic to the first bucket and a second subset of the incoming traffic to the second bucket; transmitting the webpage in appropriate configurations based on the random assignments; and obtaining one or more measurements indicative of relative performances of the appropriate configurations.

20 Claims, 12 Drawing Sheets

(56) References Cited

U.S. PATENT DOCUMENTS

| | | | |
|---|---|---|---|
| 2014/0278747 A1* | 9/2014 | Gumm | G06Q 30/0201 |
| | | | 705/7.29 |
| 2014/0280862 A1* | 9/2014 | Aurisset | H04L 67/535 |
| | | | 709/224 |
| 2015/0186521 A1* | 7/2015 | Yavilevich | G06F 16/972 |
| | | | 707/710 |
| 2018/0020065 A1* | 1/2018 | Kucera | H04L 67/535 |
| 2019/0057108 A1 | 2/2019 | Chen et al. | |
| 2020/0183999 A1* | 6/2020 | Bitondo | G06F 11/302 |
| 2020/0394679 A1 | 12/2020 | Connolly, Jr. et al. | |
| 2022/0245059 A1* | 8/2022 | Adolphson | H04L 67/567 |

* cited by examiner

Traffic Container A 400A

Bucket A1 410A (50%)

| Experiment A1-1 411A | Config. A1-1-A 411A-A (50%) | Config. A1-1-B 411A-B (50%) |
| Experiment A1-2 412A | Config. A1-2-A 412A-A (10%) | Config. A1-2-B 412A-B (20%) |
| | Config. A1-2-C 412A-C (30%) | Config. A1-2-D 412A-D (40%) |

Bucket A2 420A (50%)

Experiment A2-1: Config. A2-1-A (50%) | Config. A2-1-B (50%)

Traffic Container B 400B

Bucket B1 410B (40%)
Experiment B1-1: Config. B1-1-A (50%) | Config. B1-1-B (50%)

Bucket B2 420B (25%)
Experiment B2-1: Config. B2-1-A (75%) | Config. B2-1-B (25%)

Bucket B3 430B (35%)
Experiment B3-1: Config. B3-1-A (10%) | Config. B3-1-B (90%)

500B

Teams
[Filter by team... ▼]

Search Name
[Search container name...]

Sort By
[Container ID ▼]

Sort Order
◉ Descending
○ Ascending

Started Before
[YYYY-MM-DD 🗓]

Started After
[YYYY-MM-DD 🗓]

521

[CT229]
XPC Doc. Demo
🌀 Montecarlo
Created
2022-08-11
Available Traffic
100%
Experiments
No active tests in this container.

[CT228]
Search Container
⚛ Search & Discovery Frontend
Created
2022-08-13
Available Traffic
40%
Experiments
▨ 14987 — Search front UI widget — Ads (20%)
▦ 14984 — Search UI traffic splitter (20%)
▦ 14989 — Search Ads Click Ratio (20%)
▦ 14985 — Search Traffic — Overall Ads (20%)

Figure 5C:
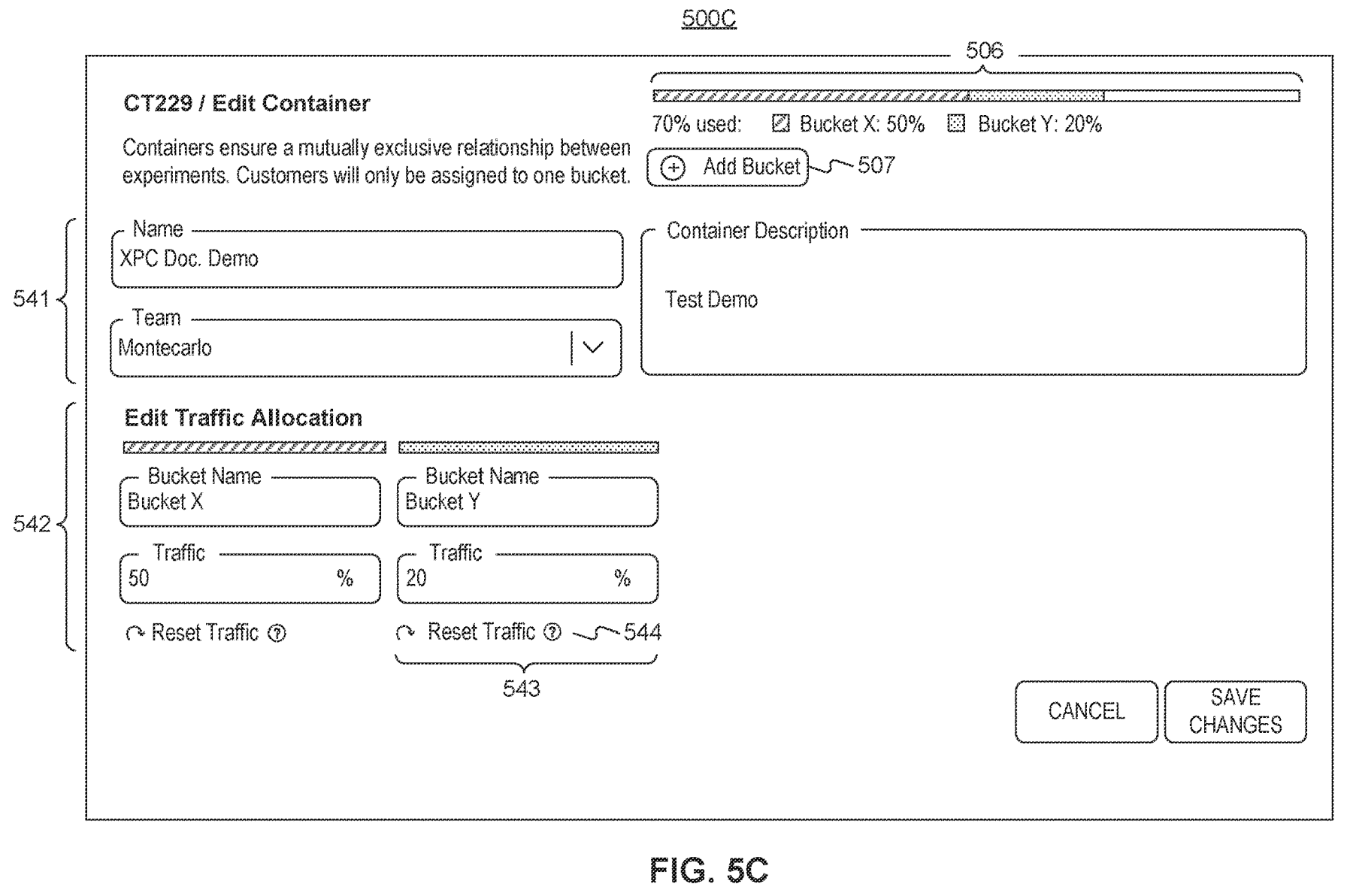

CT229 / Edit Container

Containers ensure a mutually exclusive relationship between experiments. Customers will only be assigned to one bucket.

500C

70% used: ☑ Bucket X: 50%  ▨ Bucket Y: 20%

⊕ Add Bucket — 507

506

541 {
Name
XPC Doc. Demo

Team
Montecarlo ▼

Container Description
Test Demo

542 {
Edit Traffic Allocation

Bucket Name
Bucket X

Traffic
50   %

↺ Reset Traffic ⓘ

Bucket Name
Bucket Y

Traffic
20   %

↺ Reset Traffic ⓘ — 544

543

CANCEL    SAVE CHANGES

Bucket Z

Only experiments meet the following requirements can be added to the bucket

- Not a parent experiment
- Not a synchronized test
- Is awaiting approval, created or completed
- Belongs to one of your teams or you are the owner of the experiment Add experiments to this bucket ( 15081 X ) ( 15056 X ) ( 15052 X ) — 561

✗ ✓ — 562

* Experiment 15056 will be moved from B1 in container 232 to this bucket.
* Experiment 15081 will be moved from Bucket1 in container 229 to this bucket.

⎫ 563

CANCEL    CONTINUE

FIG. 5D

SYSTEMS AND METHODS FOR SELECTIVE DEPLOYMENT OF EXPERIMENTAL CONFIGURATIONS TO MUTUALLY EXCLUSIVE GROUPS

TECHNICAL FIELD

The present disclosure generally relates to computerized systems and methods for selective deployment of experimental configurations to randomized users. In particular, embodiments of the present disclosure relate to inventive and unconventional systems that provide the ability to deploy different web configurations to mutually exclusive groups of public users using a codeless interface.

BACKGROUND

Tweaking a webpage has traditionally been a disruptive process. The webpage must be taken offline to block public access while the underlying code is updated. However, webpages must be adjusted over time to prevent falling behind the times. Updated webpages offer many advantages, such as being more visually appealing, having more efficient or accurate algorithms, and offering better user experience.

Another problem arises when a developer wishes to test a new algorithm for a webpage. A traditional server is only able to present one version of a webpage to all users that visit the webpage. The developer is thus limited to testing a single algorithm or a single combination of different configurations to the users, without any way to compare which algorithm or combination yields the optimal result. Presenting different algorithms or combinations of algorithms at different periods of time would not be an adequate solution, because uncontrollable variables such as user expectation or trend may shift over time, thus making it uncertain whether differences in user experience with different configurations are attributable to the variations in the configurations or other external variables.

Some have come up with solutions to obviate these limitations, offering the ability to display different versions of webpages to different users. However, these solutions require deep knowledge of coding to set up and deploy. The solutions also become exponentially complicated as more configurations need to be tested simultaneously. Such rise in complexity can become prohibitively difficult for large enterprises with multiple teams of developers working on different aspects of a webpage, where there may be a limited number of programmers to implement the solutions or the solutions must be easily adjustable.

Therefore, there is a need for improved methods and systems for providing the ability to selectively deploy different webpage configurations to mutually exclusive groups of users at the same time using an intuitive and user-friendly interface.

SUMMARY

One aspect of the present disclosure is directed to a method for selective deployment of experimental configurations. The method may comprise: deploying a webpage comprising a plurality of configurations, wherein the plurality of configurations exhibit different behaviors; configuring a traffic container comprising a first bucket and a second bucket based on user input; assigning one or more experiments to the traffic container based on the user input, wherein the one or more experiments determine appropriate configurations for the first bucket and the second bucket; accepting incoming traffic for accessing the webpage; randomly assigning a first subset of the incoming traffic to the first bucket and a second subset of the incoming traffic to the second bucket; transmitting the webpage in appropriate configurations based on the random assignments; and obtaining one or more measurements indicative of relative performances of the appropriate configurations.

Another aspect of the present disclosure is directed to a system for selective deployment of experimental configurations. The system may comprise at least one non-transitory computer-readable medium configured to store instructions; and at least one processor configured to execute the instructions to perform operations. The operations may comprise: deploying a webpage comprising a plurality of configurations, wherein the plurality of configurations exhibit different behaviors; configuring a traffic container comprising a first bucket and a second bucket based on user input; assigning one or more experiments to the traffic container based on the user input, wherein the one or more experiments determine appropriate configurations for the first bucket and the second bucket; accepting incoming traffic for accessing the webpage; randomly assigning a first subset of the incoming traffic to the first bucket and a second subset of the incoming traffic to the second bucket; transmitting the webpage in appropriate configurations based on the random assignments; and obtaining one or more measurements indicative of relative performances of the appropriate configurations.

Yet another aspect of the present disclosure is directed to another system for selective deployment of experimental configurations. The system may comprise at least one non-transitory computer-readable medium configured to store instructions; and at least one processor configured to execute the instructions to perform operations. The operations may comprise: deploying a webpage comprising a plurality of configurations, wherein the plurality of configurations exhibit different behaviors; accepting incoming traffic for accessing the webpage; randomly assigning: a first subset of the incoming traffic to a first configuration, a second subset of the incoming traffic to a second configuration, a third subset of the incoming traffic to a third configuration, and a fourth subset of the incoming traffic to a fourth configuration; transmitting the webpage in one of the plurality of configurations based on the random assignments, wherein the first subset is mutually exclusive with the second subset but not with the third subset; and obtaining one or more measurements indicative of relative performances of the plurality of configurations.

Other systems, methods, and computer-readable media are also discussed herein.

BRIEF DESCRIPTION OF THE DRAWINGS

Figure 1C:
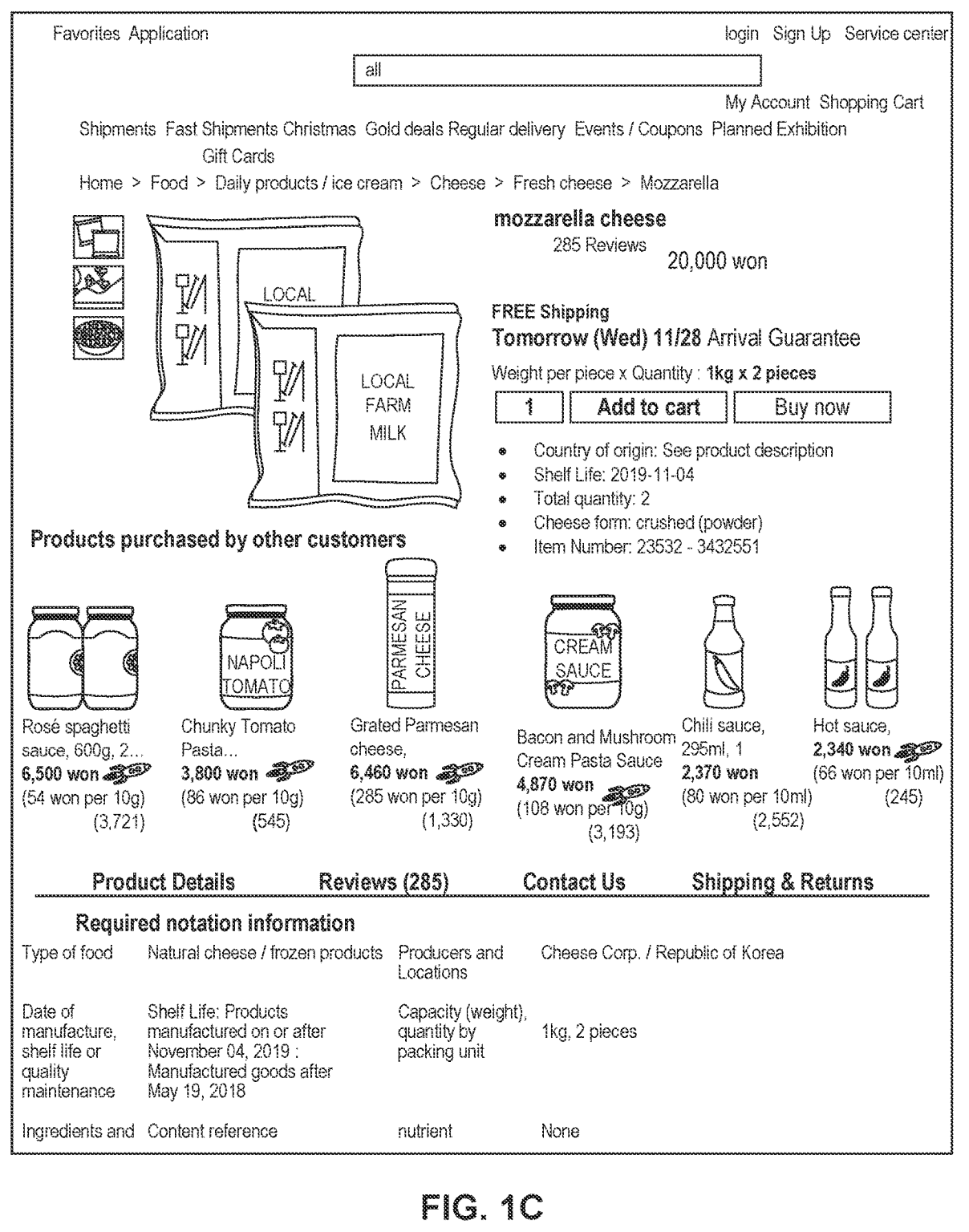

FIG. 1C depicts a sample Single Detail Page (SDP) that includes a product and information about the product along with interactive user interface elements, consistent with the disclosed embodiments.

FIG. 4 is an exemplary diagram illustrating how the incoming traffic is assigned to different configurations, consistent with the disclosed embodiments.

FIG. 5B is an exemplary container browser UI for browsing through a list of available containers, consistent with the disclosed embodiments.

FIG. 5C is an exemplary container editor UI for editing a container, consistent with the disclosed embodiments.

FIG. 5D is an exemplary bucket editor UI for editing a bucket, consistent with the disclosed embodiments.

DETAILED DESCRIPTION

Figure 1A:
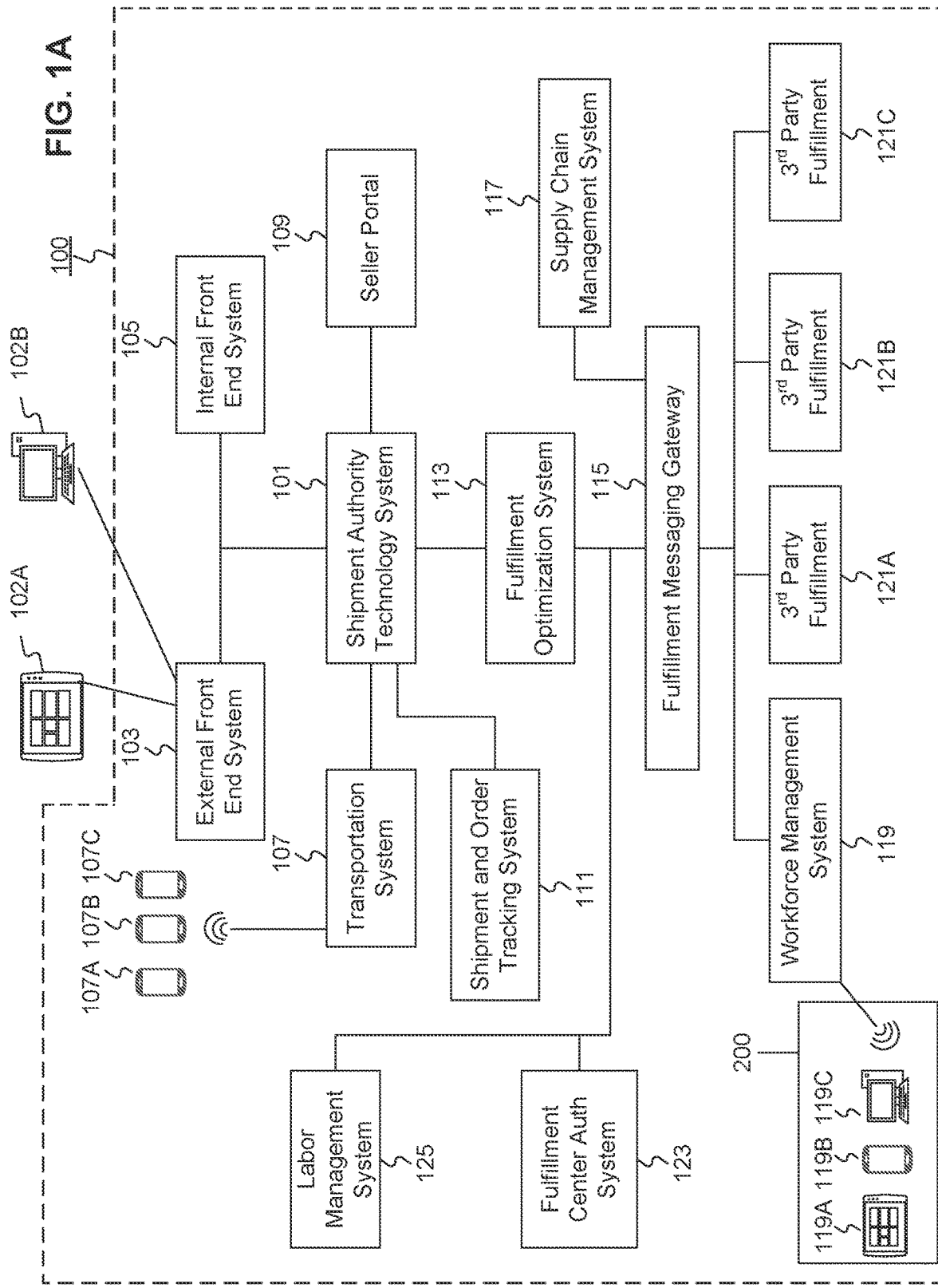
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for deploying different web configurations to mutually exclusive groups of users at the same time using an intuitive and user-friendly interface, avoiding the need to understand or utilize programming languages or other code to manipulate combinations of different web configurations.

Such systems and methods may be used for any type of webpages designed for any purpose, such as an online shopping mall, a news site, a search engine, a blog, or the like. Different configurations may be set up to test any type of configurations, such as different search algorithms, different product recommendation algorithms, different advertisement layouts, different decorative elements, or the like. While the following disclosure is written with respect to an e-commerce website and describes different embodiments in the context of different use case scenarios useful for such website, the disclosed systems and methods are not intended to be limited to such use.

Referring to FIG. 1A, a schematic block diagram 100 illustrating an exemplary embodiment of a system compris-ing computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (which may be, in some embodiments, inside of a fulfillment center (FC)), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center. Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. During a fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in a fulfillment center, other products may be stored off-site, may be produced on demand, or may be otherwise unavailable for storage in a fulfillment center. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
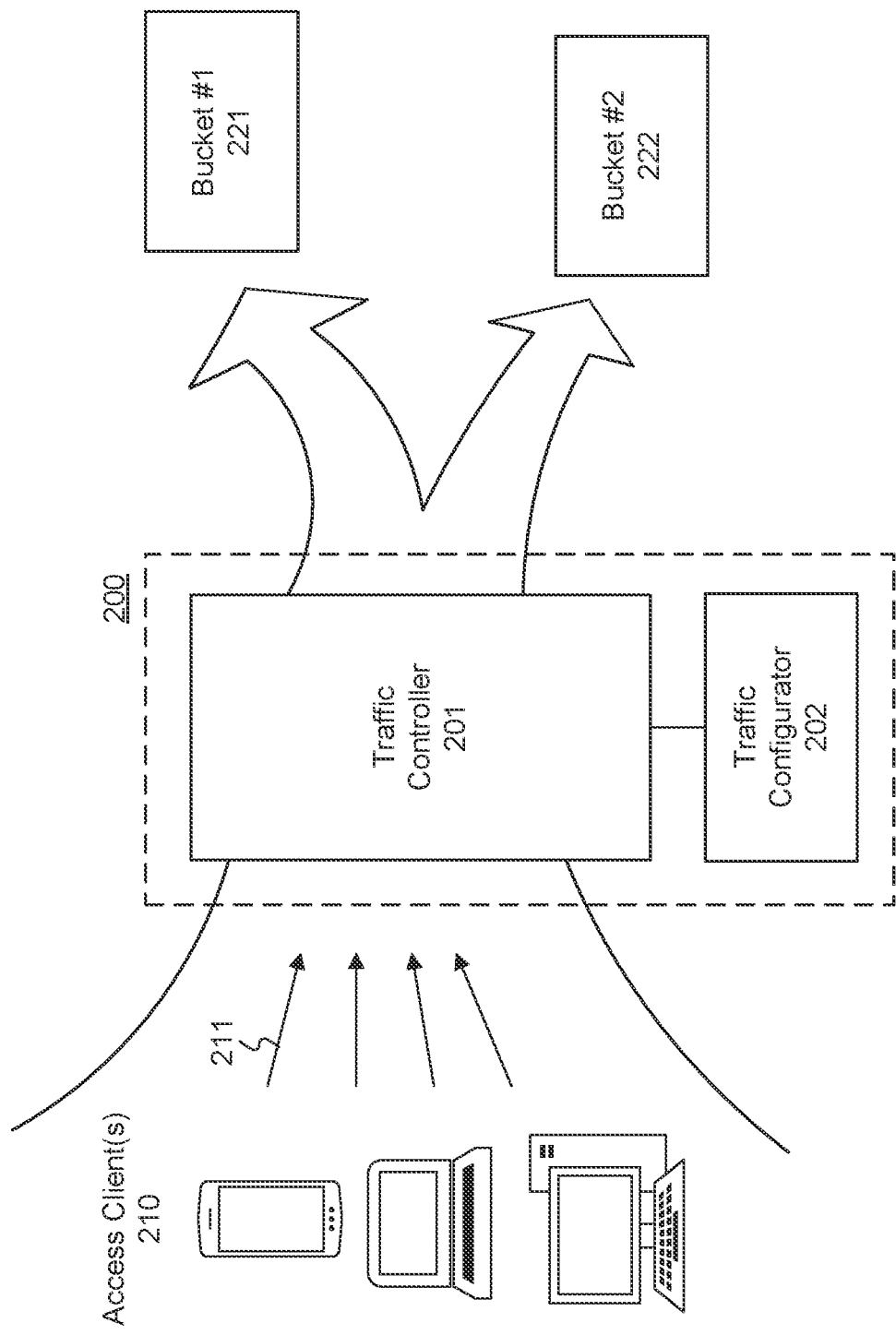
FIG. 2 is a schematic block diagram illustrating an exemplary embodiment of a computerized system for routing incoming traffic to different configurations, consistent with the disclosed embodiments.

FIG. 2 is a schematic block diagram illustrating an exemplary embodiment of a computerized system 200 for routing incoming traffic to different configurations. Computerized system 200 may comprise one or more component systems, modules, software units, or any combination thereof, each of which may be connected to one another via one or more networks or electrical connections. The individual components can be located within one geographical location or be geographically dispersed.

In some embodiments, computerized system 200 may comprise traffic controller 201 and traffic configurator 202.

Traffic controller 201 may be any computerized component configured to accept incoming traffic from access clients 210, assign one or more of available buckets (e.g., bucket #1 221 or bucket #2 222), and transmit data associated with corresponding configurations back to access clients 210. For example, traffic controller 201 may be implemented as a part of external front end system 103, as it generates various pages (e.g., SRP or SDP) in response to requests from external devices (e.g., mobile device 102A or computer 102B). As described below with respect to FIG. 4, a bucket refers to a portion of incoming traffic set aside by traffic controller 201 to test different configurations.

A typical website consists of a host server (not shown) storing data associated with the website. As used herein, a website is a collection of one or more webpages, where each webpage has a single published configuration. The host server is made accessible to users (the public or a select group of people), who, using access clients 210, individually sends access request 211 to the host server. The host server then responds by transmitting the data associated with a particular webpage requested by the access request 211 to corresponding access client 210. As used herein, a collection of access request 211 is referred to as incoming traffic. Access clients 210 may be any Internet-capable device such as a smartphone, laptop, desktop, tablet, or the like.

In the disclosed embodiments, a website may comprise one or more webpages with two or more pilot configurations. Each pilot configuration may exhibit behaviors different from the others. The different behaviors may include any aspect of a webpage, such as different layouts, different algorithms, or different contents. For example, a SRP (e.g., FIG. 1B) may comprise two pilot configurations, where one configuration orders product results in the order of relevance and the other configurations orders the product results in the order of the number of customer reviews. In another example, a SDP (e.g., FIG. 1C) may comprise three pilot configurations, where each pilot configuration presents product information in different layouts. In some embodiments, pilot configurations for a webpage may comprise different combinations of independent behaviors, where, for example, a first configuration uses a first search algorithm and a first advertisement suggestion algorithm, a second configuration uses the first search algorithm and a second advertisement suggestion algorithm, a third configuration uses a second search algorithm and the first advertisement suggestion algorithm, and a fourth configuration uses the second search algorithm and the second advertisement suggestion algorithm. The number of different pilot configurations and the types of behaviors are only exemplary, and any number of pilot configurations exhibiting different behaviors may be associated with a webpage.

Turning back to traffic controller 201, traffic controller 201 may act as a gatekeeper for incoming traffic, determining which pilot configuration should be assigned to a particular access request 211. In some embodiments, traffic controller 201 may randomly assign individual access request 211 to different buckets (e.g., bucket #1 221 or bucket #2 222), each of which is associated with a respective pilot configuration. Traffic controller 201 may then send a signal to the host server to transmit data associated with the corresponding pilot configuration in response to each access request 211.

Traffic configurator 202, in some embodiments, may include one or more computing devices or a software program configured to receive codeless instructions from an administrator to adjust behaviors of traffic controller 201. For example, traffic configurator 202 may be implemented as a standalone computing device or as part of internal front end system 105 to control how external front end system 103 generates various pages (e.g., SRP or SDP) in response to requests from external devices (e.g., mobile device 102A or computer 102B). The process for configuring traffic controller 201 to randomly assign one or more configurations to an access request 211 is described below in further detail with respect to FIG. 3.

In this way, disclosed embodiments allow a host server to transmit different pilot configurations of a webpage to different users concurrently. This allows administrators of the webpage to test different configurations without disrupting user access and while minimizing variance in testing the different configurations.

Figure 3:
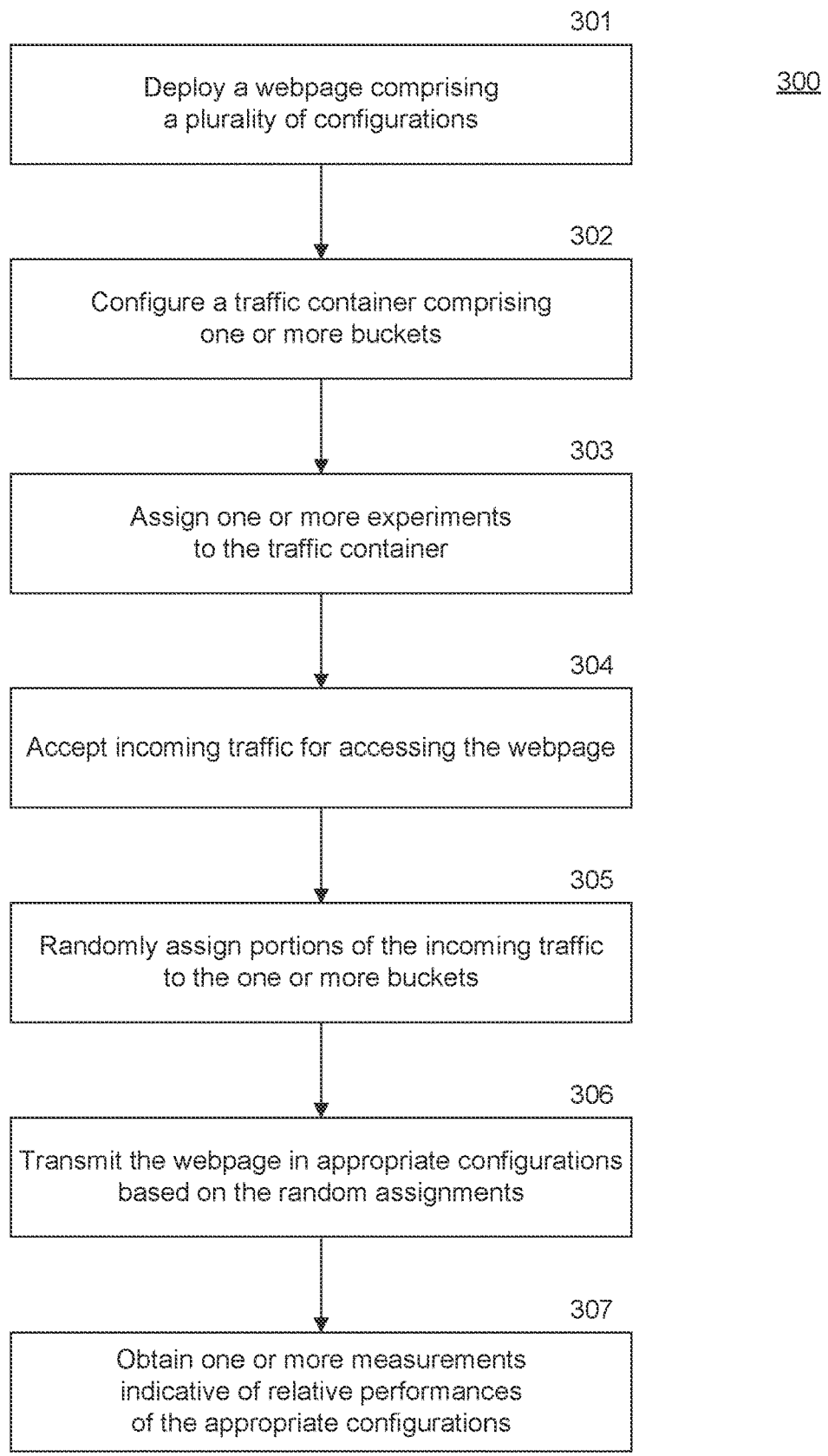
FIG. 3 is a flowchart of an exemplary computerized process for configuring and routing the incoming traffic to different configurations, consistent with the disclosed embodiments.

FIG. 3 is a flowchart of an exemplary computerized process 300 for configuring and routing the incoming traffic to different configurations. In some embodiments, process 300 may be performed by computerized system 200 comprising traffic controller 201 and traffic configurator 202 as discussed above. computerized system 200 may also be connected to the other systems depicted in FIG. 1A to generate webpages in response to requests from access clients 210.

At step 301, computerized system 200 may deploy a webpage comprising a plurality of possible configurations. The plurality of configurations may be experimental or going through user testing for a full deployment at a point in the future. In some embodiments, the plurality of configurations may exhibit different behaviors as discussed above, where a webpage generated for an access client 210 may include more than one configuration.

At step 302, computerized system 200, via traffic configurator 202, may configure a traffic container comprising one or more buckets. In some embodiments, configuring the traffic container may comprise displaying a user interface (UI) to an administrator using traffic configurator 202, receiving codeless instructions from the administrator, converting the codeless instructions to computer-readable instructions, and executing the computer-readable instructions. In some embodiments, the codeless instructions may comprise user input, manipulating various GUI elements that will be described in further detail below with respect to FIGS. 5 and 6.

As used herein, a traffic container is configured to set aside a subset of incoming traffic to be subject to one or more experiments associated with the traffic container. An experiment comprises of a plurality of pilot configurations of a webpage. Subjecting incoming traffic to the experiment allows administrators of the webpage to present the pilot configurations to a limited number of users visiting the webpage while ensuring that other factors that can impact user experience (e.g., time of day, societal trends, etc.) stay constant. In some embodiments, the plurality of pilot configurations may include a specific configuration or a combination of configurations of the webpage that are not yet published to all users generally.

In some embodiments where there are one or more experiments that may impact user experience for another experiment, traffic configurator 202 may allow an administrator to set up a traffic container with a plurality of buckets. As used herein, a bucket may be considered a sub-container within a traffic container, where the bucket is configured to set aside a subset of incoming traffic assigned to the traffic container. The portion of incoming traffic assigned to the bucket may be subject to one or more experiments associated with the bucket. Relationship between traffic containers, buckets, and experiments are described in more detail below with respect to FIG. 4.

In some embodiments, computerized system 200 may be configured to create and manage a plurality of traffic containers, each comprising one or more buckets. Each traffic container may be assigned, via traffic configurator 202, a set of parameters for determining which of the incoming traffic are to be assigned to each traffic container. The set of parameters may include, for example, the operating system (e.g., Android, iOS, Windows, or Mac) of the corresponding access client 210, region where the corresponding access client 210 is located, preferred language of the corresponding access client 210, a predetermined percentage of all incoming traffic, or any other parameter that can be used to limit the number of access requests 211 that will be assigned to a traffic container. In some embodiments, the sets of parameters for different traffic containers may not be mutually exclusive, thus allowing some access requests 211 to be assigned to two or more traffic containers. In further embodiments, the sum of all access requests 211 assigned to any traffic container may be less than all incoming traffic (i.e., not all incoming traffic is shown pilot configurations), or the sum may be more than all incoming traffic (i.e., some access requests 211 are shown pilot configurations corresponding to more than one traffic container).

In contrast to traffic containers, the portion of incoming traffic assigned to one bucket within a traffic container may be completely different from another portion of the incoming traffic assigned to another bucket of the same traffic container. This configuration allows an administrator to set up mutually exclusive experiments, where a group of users visiting the page are subjected to one experiment are never subjected to the other mutually exclusive experiments.

At step 303, computerized system 200, via traffic configurator 202, may assign one or more experiments to the traffic container based on user input. The user input may be codeless instructions received by traffic configurator 202 through a process similar to that described above at step 302. Such codeless instructions may comprise natural language, text, pseudocode, manipulations of UI elements, or the like. In some embodiments, the codeless instructions may direct traffic configurator 202 to create one or more buckets within the traffic container, where each of the one or more buckets may also comprise one or more experiments.

At step 304, computerized system 200, via traffic controller 201, may accept incoming traffic for accessing the webpage. Then at step 305, traffic controller 201 may randomly assign a subset of the incoming traffic (i.e., access requests 211) to one or more traffic containers and to one or more buckets therein. In some embodiments, the random assignments may be based on the different parameters preconfigured via traffic configurator 202.

For example, traffic controller 201 may assign just 10% of the incoming traffic to a particular traffic container. In this exemplary embodiment where the particular traffic container comprises two buckets, traffic controller 201 may further randomly assign, for example, 50% of the incoming traffic assigned to the traffic container to a first bucket and the other 50% to the second bucket. In other words, the first and second buckets would each be assigned 5% of total incoming traffic. Furthermore, traffic controller 201 may assign the portion of incoming traffic assigned to either bucket to the experiments associated with respective buckets. For example, if the first bucket in the exemplary embodiment has one experiment with two different pilot configurations, 50% of the incoming traffic assigned to the first bucket would be shown one of the two pilot configurations, while the other 50% is shown the other pilot configuration. The parameters (e.g., % of incoming traffic), their values (e.g., 50%), and the number of buckets and experiments discussed above are only exemplary, and traffic configurator 202 may configure traffic controller 201 to use any different combinations of buckets, experiments, or configurations may be used.

In some embodiments, traffic controller 201 may filter out, among the portions of incoming traffic assigned to a traffic container, access requests 211 that are incompatible with preconfigured parameters for the buckets or the experiments associated with the traffic container. For example, each of the buckets or the experiments may have parameters for selecting a particular set of access requests 211 that are compatible with the buckets or the experiments. Similar to the parameters for traffic containers discussed above, the parameters for the buckets and experiments may include, for example, the operating system (e.g., Android, iOS, Windows, or Mac) of the corresponding access client 210, region where the corresponding access client 201 is located, preferred language of the corresponding access client 210, or the like.

At step 306, with respect to each access request 211 that is assigned to a traffic container, computerized system 200, via traffic controller 201, may retrieve and transmit the webpage in the pilot configuration that corresponds to the experiment that the access request 211 has been randomly assigned to. In some embodiments, traffic controller 201 may transmit a regular, default webpage that has no experimental features if the particular access request 211 has been filtered out at step 305.

At step 307, computerized system 200 may obtain one or more measurements indicative of relative performances of the appropriate pilot configurations that have been transmitted to access requests 211. In some embodiments, obtaining the one or more measurements may comprise monitoring subsequent access requests 211 from access clients 210 as the users of access clients 210 interact with the transmitted pilot configuration. This may allow computerized system 200 to determine, for example, whether the users clicked on certain elements (e.g., advertisement) of the webpage, whether the users ended up purchasing the product displayed in the webpage, or any other activity that indicates the users' engagement with the webpage. Comparison of these activities from one group of users that received one pilot configuration with similar activities from another group of users that received a different pilot configuration may suggest that one pilot configuration is better than another pilot configuration in terms of, for example, generating new sales, raising advertisement revenue, maintaining higher user interest, or any other desirable metrics that an administrator may wish to track.

In some embodiments, traffic controller 201 may be configured to keep a log of which pilot configuration was transmitted in response to access request 211 from access client 210. When traffic controller 201 determines that it received a new access request 211 from a known access client 210 that had sent an access request before, traffic controller 201 may be configured assign the same traffic container, bucket, and experiment for the new access request 211, so that the same pilot configuration is transmitted to the same access client 210. This would ensure consistent user experience for the user of the known access client 210 and prevent one experiment from contaminating other experiments.

FIG. 4 is an exemplary diagram illustrating how the incoming traffic may be assigned to different configurations.

As described above with respect to FIG. 3, traffic configurator 202 may set up, and traffic controller 201 may manage, more than one traffic container at a time. Each traffic container, in turn, may comprise one or more buckets, each of which may also comprise one or more experiments. Still further, each experiment may comprise two or more configurations. Such features may be useful for a large corporate setting, where multiple teams of people may wish to test multiple different features while ensuring that one experiment does not affect another experiment.

The exemplary embodiment depicted in FIG. 4 shows a complex set up comprising two traffic containers: traffic container A 400A and traffic container B 400B. In some embodiments, the portions of incoming traffic assigned to traffic container A 400A and traffic container B 400B may be non-mutually exclusive, which means that a particular access request 211 may be assigned to both traffic container A 400A and traffic container B 400B at the same time. Such situations may arise, for example, when the pilot configurations associated with traffic container A 400A belong to one webpage in a website while the pilot configurations associated with traffic container B 400B belong to another webpage in the same website.

In the exemplary embodiment, traffic container A 400A comprises two buckets: bucket A1 410A and bucket A2 420A, which evenly split the portion of incoming traffic assigned to traffic container A 400A. In other embodiments, the split may be uneven (e.g., 40% vs. 60%) or there may be more than two buckets (e.g., bucket B1 410B, bucket B2 420B, and bucket B3 430B).

Regardless of the split ratio, the portions of incoming traffic assigned to each bucket within a traffic container may be mutually exclusive, which means that a particular access request 211 assigned to one bucket will not be assigned to another bucket in the same traffic container. Such situation may be useful, when there is a chance for pilot configurations associated with one bucket to affect user experience for other pilot configurations associated with the other buckets. For example, pilot configurations associated with bucket A1 410A may apply different search algorithms for a SRP (e.g., FIG. 1B), while pilot configurations associated with bucket A2 420A may apply different layouts of the SRP. Different search algorithms and layouts of a SRP may both affect user behavior, which would lead to inaccurate comparison of the different search algorithms' performance.

Turning back to the exemplary embodiment again, bucket A1 410A comprises two experiments: experiment A1-1 411A and experiment A1-2 412A. Here, the portion of incoming traffic assigned to bucket A1 410 may be assigned to both experiments, where traffic controller 201 may present one of two pilot configurations: configuration A1-1-A 411A-A or configuration A1-1-B 411A-B, and one of four pilot configurations: configuration A1-2-A 412A-A, configuration A1-2-B 412A-B, configuration A1-2-A 412A-C, or configuration A1-2-B 412A-D. Such combination of experiments may occur, when certain features must be presented together.

For example, a SRP may comprise a filter pane for users visiting the webpage to specify different filters (e.g., category, price, color) to narrow down search results. One experiment may compare two different layouts that present the filter pane using dropdown lists or radio buttons. Another experiment may also exist, which comprises different sets of filters to be presented in the filter pane of the SRP. It may be more efficient to stack these two experiments together into one bucket and let traffic controller 201 assign different combinations of pilot configurations to access requests 211, rather than running them one after the other or in different buckets. Stacking the two experiments together may also allow an administrator to observe how the different features interact with each other and allow him or her to determine the optimal combination of features.

In some embodiments, two or more experiments that are stacked together in one bucket may be in a parent-child relationship. The child experiment may be dependent on a feature in the parent experiment. For example, a parent experiment may comprise a pilot configuration with a filter pane another pilot configuration without the filter pane. A child experiment may comprise a pilot configuration with drop down lists in the filter pane and another pilot configuration with radio buttons in the filter pane. In this exemplary embodiment, having the parent experiment in the same bucket may a prerequisite to adding the child experiment to the bucket.

In some embodiments, setting up experiments with parent-child relationship may allow modular testing, where different combinations of parent-child experiments can be used to quickly test different aspects of a webpage. For example, one parent experiment can be created once and paired with different child experiments without having to program the parent experiment into each child experiment. In further embodiments, multi-level families may also be available, where there are three or more generations of experiments that are related by parent-child relationship.

In some embodiments, two or more experiments may be synchronized. Synchronized experiments may comprise a set of related experiments in multiple independent systems and be assigned the same portion of incoming traffic. In this way, the same pilot configurations in the related experiments may be presented to the same users for consistency. For example, a first experiment may be set up to test different algorithms for displaying advertisements in an SRP. A second experiment may be set up to test the same set of different algorithms or another set of algorithms that are related to the previous set in an SDP. The two experiments may be set up as synchronized experiments, so that a user that was shown advertisements based on one algorithm in an SRP can be shown advertisements based on the same or related algorithm in an SDP.

The arrangements and numbers depicted in the exemplary embodiment of FIG. 4 are provided only to describe certain aspects of the disclosed embodiments and are only intended to serve as examples. No limiting effect is thus intended. Specifically, the number of traffic containers, the number of buckets within the traffic containers, the number of experiments within the buckets, the number of pilot configurations within the experiments, percentage splits between the buckets and pilot configurations, are only exemplary, and the numbers may be freely adjustable as needed.

FIGS. 5A-5D are exemplary UIs for receiving codeless instructions from administrators to adjust behaviors of traffic controller 201. In some embodiments, the exemplary UIs may be implemented in traffic configurator 202 and shown to the administrators via external front end system 103. The various UI elements, numbers, arrangements, and layouts depicted in FIGS. 5A-5D are provided only as examples, and no limiting effect is intended beyond the features and functionalities described herein.

Figure 5A:
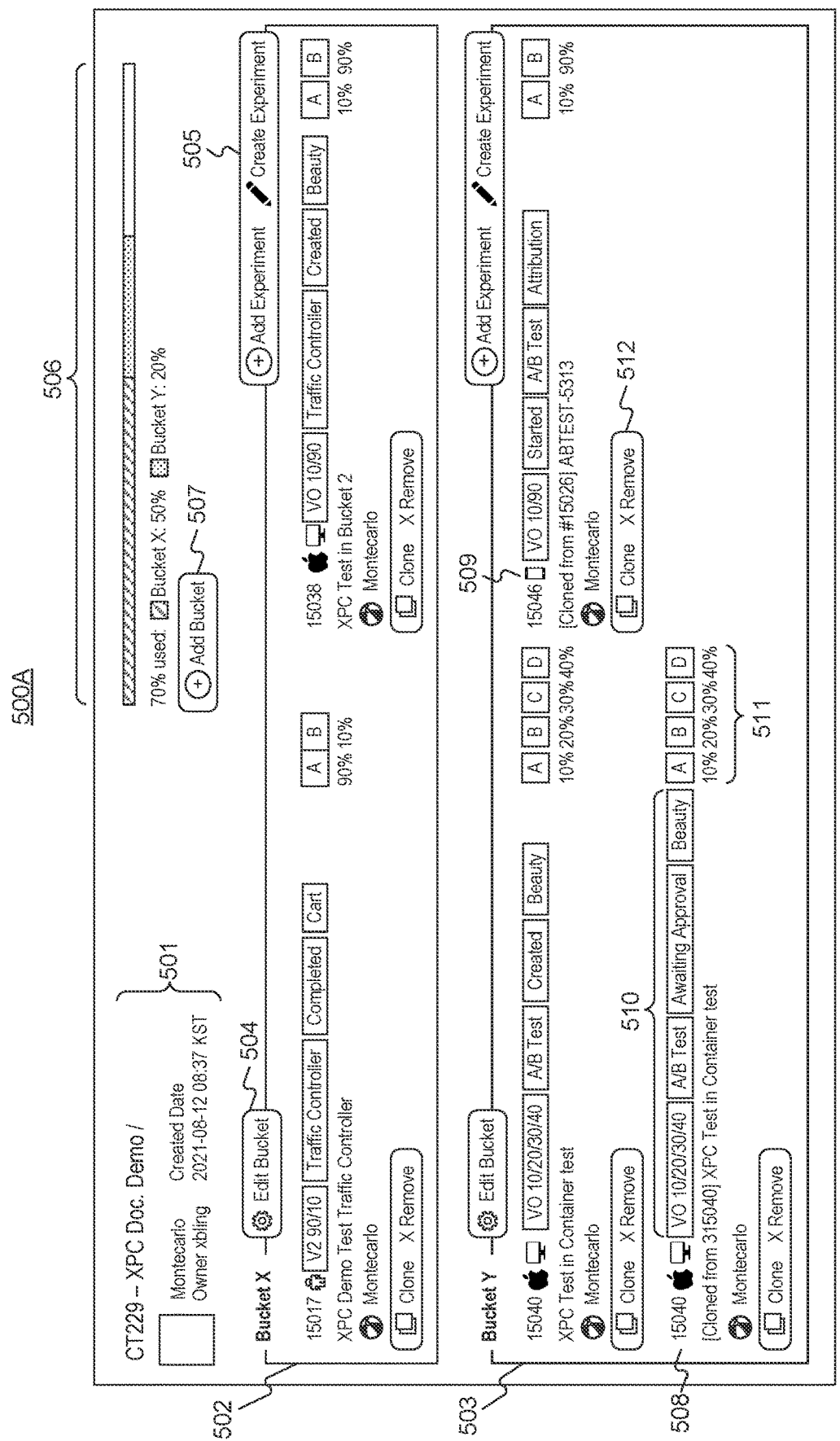
FIG. 5A is an exemplary container manager user interface (UI) for managing different pilot configurations, consistent with the disclosed embodiments.

FIG. 5A is an exemplary container manager UI 500A for managing different pilot configurations. Container manager UI 500A may allow administrators to view and make changes to current state of any particular container. For example, container manager UI 500A may provide administrative information 501 such as the title of the container, specific team or administrator that created the container, and date of creation or modification.

Container manager UI 500A may also provide an overview of one or more buckets (e.g., bucket X 502 and bucket Y 503) assigned to the container and options to make changes to each bucket using an edit bucket button 504 or an edit experiments button 505. For example, the current container depicted in FIG. 5A may correspond to traffic container A 400A in FIG. 4, and bucket X 502 may correspond to bucket A1 410A in FIG. 4.

Further, container manager UI 500A may provide a summary graph 506 that show a breakdown of incoming traffic assigned to the container. In some embodiments, the breakdown may be represented by percentages of incoming traffic assigned to each bucket relative to the portion of incoming traffic assigned to the container (e.g., 50% for bucket X) or by percentages relative to the entire incoming traffic received by traffic controller 201 (e.g., if container is assigned 10% of entire incoming traffic, 5% for bucket X). Container manager UI 500A may also allow administrators to add additional buckets using add bucket button 507.

Turning to the overviews of individual buckets (e.g., bucket X 502 and bucket Y 503), container manager UI 500A may display information on the one or more experiments, identified by experiment numbers 508 (e.g., experiment 15040 531), assigned to the bucket. For example, experiment 15040 may correspond to experiment A1-2 412A in FIG. 4.

Container manager UI 500A may also display one or more preconfigured parameters 509, one or more tags 510, and a traffic distribution diagram 511 for each experiment within a bucket, as well as abilities to duplicate or remove an experiment using modifier button 512.

Preconfigured parameters 509 may indicate operating systems or device types of access clients 210 compatible with a particular experiment. For example, experiment 15040 displays icons of Apple and a computer, indicating that experiment 15040 is only assigned to access clients 210 that use an operating system developed by Apple. As another example, experiment 15046 displays an icon of a mobile device, indicating that experiment 15046 is only assigned to access clients 210 that are mobile devices.

Tags 510 may communicate specific information on the corresponding experiment. For example, tags 510 may comprise:
- a template traffic distribution (e.g., "V0 10/20/30/40" indicating that access requests 211 assigned to experiment 15040 are split 10:20:30:40 among four different pilot configurations);
- an experiment type (e.g., "A/B Test" or "Traffic Controller");
- an experiment status (e.g., "Awaiting Approval," "Created," "Completed," "Started"); and
- an experiment category (e.g., "Beauty," "Cart," "Attribution").

Other tags or information on experiments may be shown in addition to or in lieu of those depicted in FIG. 5A.

Traffic distribution diagram 511 may show how different pilot configurations of an experiment are assigned to the portion of incoming traffic assigned to a bucket. For example, among the 20% of the portion of incoming traffic assigned to bucket Y, 10% is assigned to pilot configuration A, 20% to pilot configuration B, and so on.

In some embodiments, container browser UI 500B may provide ability for administrators to add or edit buckets using add bucket button 507 or edit bucket button 504, respectively. Clicking those buttons may present administrators with another UI for adding or editing a bucket (e.g., specifying a title, allocating a percentage of incoming traffic, or resetting traffic assignments for access requests 211). An input from the administrators may comprise textual entries (in natural language or pseudocode) or manipulation of UI elements that does not involve inputting any computer programming codes or knowledge thereof. Traffic configurator 202, instead, may be configured to convert such codeless instructions into computer-readable instructions that can direct behaviors of traffic controller 201.

FIG. 5B is an exemplary container browser UI 500B for browsing through a list of available containers (e.g., CT228 and CT229). Container browser UI 500B may comprise a filter pane 521 and a list pane 522. Filter pane 521 may include one or more filters that can narrow down the list of containers displayed in list pane 522, such as the team that created the containers, name of the containers, container IDs, creation dates, or the like List pane 522 may display one or more containers that satisfy the filters specified in filter pane 521. Information displayed for each container may comprise, for example, container ID (e.g., container CT228), container name (e.g., "Search Container"), creator team (e.g., "Search & Discovery Frontend" team), creation date, amount of traffic available for allocation, and a list of experiments 523 assigned to the container. In some embodiments, each of the experiments in the list of experiments 523 may be labeled with a bucket icon 524 that indicates which bucket within the container each experiment belongs to. For example, experiment 14987 may belong to one bucket in container CT228 and experiments 14984, 14989, and 14985 may belong to another bucket in container CT228.

FIG. 5C is an exemplary container editor UI 500C for editing a container. In some embodiments, container editor UI 500C may be configured to display information pane 541 for administrative information, such as container name, team name, and description, which may be displayed in container manager UI 500A and container browser 500B. Container editor UI 500C may also be configured to receive codeless instructions on creating a new bucket 543 via a traffic allocation pane 542. In some embodiments, traffic allocation pane 542 may generate additional buckets (e.g., new bucket 543) with each press of add bucket button 507. Codeless instructions may comprise instructions on what percentage of incoming traffic assigned to the current container should be allocated to the each bucket (e.g., 20% for new bucket 543). A sum of all traffic allocated to buckets in the current container must not exceed 100%.

In some embodiments, traffic allocation for each bucket may only be increased or reset in order to ensure that no access request 211 that was previously assigned to one bucket (and thus exposed to a pilot configuration therein) is released and assigned to another bucket (and thus exposed to another pilot configuration). For example, decreasing traffic allocation for bucket A1 410A of FIG. 4 from 50% to 25% may cause half of the previously allocated access requests 211 (e.g., one access request assigned to bucket A1 410A) to be released. The released access requests 211 may be reassigned to another bucket, such as bucket A2 420A, or left unassigned for future assignment. This may cause contamination between experiments and defeat the purpose of keeping each bucket mutually exclusive.

Alternatively, traffic allocation may be reset by pressing a reset traffic button 544. Resetting the traffic may unlink all access request 211 (and thus their corresponding access clients 210) previously assigned to a bucket, allowing the unlinked access requests 211 to be assigned to other buckets or experiments and allowing new access requests 211 to be assigned to the bucket that has been reset. In contrast to decreasing traffic allocation described above, resetting traffic does not contaminate experiments because all previously assigned access request 211 is unlinked and randomly assigned again, as opposed to only a subset of the requests being assigned to another bucket while the rest of the requests stay with the previously assigned bucket. In some embodiments, only the buckets with no experiment or with only archived (i.e., inactive) experiments may be reset in order to prevent experiments from being interrupted unintentionally.

FIG. 5D is an exemplary bucket editor UI 500D for editing a bucket. Bucket editor UI 500D may allow administrators to add or remove experiments from a bucket using an experiment pick list 561. Bucket editor UI 500D may receive experiment ID numbers as user input either through manual textual input or by pressing dropdown button 562 and choosing an experiment from a list. In some embodiments, only the experiments that is not a parent experiment; is not a synchronized test; is awaiting approval, created, or completed; and belongs to a current administrator or their team may be added to the bucket. Still further, bucket editor UI 500D may display warning messages 563 that indicate if any of the experiments added in experiment pick list 561 is currently assigned to another bucket and will be transferred to the current bucket upon creation of the bucket.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented method for selective deployment of experimental configurations, the computer-implemented method comprising:
   deploying a webpage comprising a plurality of configurations, wherein the plurality of configurations exhibit different behaviors;
   configuring a traffic container comprising a first bucket and a second bucket based on user input;
   assigning one or more experiments to the traffic container based on the user input, wherein the one or more experiments determine appropriate configurations among the plurality of configurations for the first bucket and the second bucket, wherein assigning the one or more experiments includes:
      determining current assignments of the one or more experiments; and
      generating a message based on the current assignments and an indication that the one or more experiments will be reassigned;
   accepting incoming traffic for accessing the webpage;
   randomly assigning a first subset of the incoming traffic to the first bucket and a second subset of the incoming traffic to the second bucket;
   transmitting the webpage in the appropriate configurations based on the random assignments; and
   obtaining one or more measurements indicative of relative performances of the appropriate configurations.

2. The computer-implemented method of claim 1, wherein the different behaviors comprise any one or combination of: presenting different layouts, using different algorithms, and displaying different contents.

3. The computer-implemented method of claim 1, wherein the plurality of configurations each comprise different combination of independent behaviors.

4. The computer-implemented method of claim 3, wherein the independent behaviors comprise at least one of: page layout, search algorithm, and advertisement suggestion.

5. The computer-implemented method of claim 1, wherein the first subset and the second subset are mutually exclusive.

6. The computer-implemented method of claim 1, wherein a union of the first subset of the incoming traffic and the second subset of the incoming traffic is less than the incoming traffic.

7. The computer-implemented method of claim 1, wherein the user input comprises at least one codeless manipulation of the traffic container.

8. The computer-implemented method of claim 1, further comprising:
   adding a third bucket to the traffic container, wherein the one or more experiments determine the appropriate configurations for the third bucket;
   randomly assigning a third subset of the incoming traffic to the third bucket, wherein the first subset, the second subset, and the third subset comprise different proportions of the incoming traffic.

9. The computer-implemented method of claim 1, wherein the one or more experiments comprise at least two experiments that have a parent-child relationship or are synchronized.

10. The computer-implemented method of claim 1, wherein subsequent incoming traffic associated with a first external user device is assigned to a first configuration if a first incoming traffic associated with the first external user device had been randomly assigned to the first configuration.

11. A computer-implemented system for selective deployment of experimental configurations, the computer-implemented system comprising:
at least one non-transitory computer-readable medium configured to store instructions; and
at least one processor configured to execute the instructions to perform operations comprising:
deploying a webpage comprising a plurality of configurations, wherein the plurality of configurations exhibit different behaviors;
configuring a traffic container comprising a first bucket and a second bucket based on user input;
assigning one or more experiments to the traffic container based on the user input, wherein the one or more experiments determine the appropriate configurations among the plurality of configurations for the first bucket and the second bucket, wherein assigning the one or more experiments includes:
determining current assignments of the one or more experiments; and
generating a message based on the current assignments and an indication that the one or more experiments will be reassigned;
accepting incoming traffic for accessing the webpage;
randomly assigning a first subset of the incoming traffic to the first bucket and a second subset of the incoming traffic to the second bucket;
transmitting the webpage in the appropriate configurations based on the random assignments; and
obtaining one or more measurements indicative of relative performances of the appropriate configurations.

12. The computer-implemented system of claim 11, wherein the different behaviors comprise any one or combination of: presenting different layouts, using different algorithms, and displaying different contents.

13. The computer-implemented system of claim 11, wherein the plurality of configurations each comprise different combination of independent behaviors.

14. The computer-implemented system of claim 11, wherein the first subset and the second subset are mutually exclusive.

15. The computer-implemented system of claim 11, wherein a union of the first subset of the incoming traffic and the second subset of the incoming traffic is less than the incoming traffic.

16. The computer-implemented system of claim 11, wherein the user input comprises at least one codeless manipulation of the traffic container.

17. The computer-implemented system of claim 11, further comprising:
adding a third bucket to the traffic container, wherein the one or more experiments determine the appropriate configurations for the third bucket;
randomly assigning a third subset of the incoming traffic to the third bucket, wherein the first subset, the second subset, and the third subset comprise different proportions of the incoming traffic.

18. The computer-implemented system of claim 11, wherein the one or more experiments comprise at least two experiments that have a parent-child relationship or are synchronized.

19. The computer-implemented system of claim 11, wherein subsequent incoming traffic associated with a first external user device is assigned to a first configuration if a first incoming traffic associated with the first external user device had been randomly assigned to the first configuration.

20. A computer-implemented system for selective deployment of experimental configurations, the computer-implemented system comprising:
at least one non-transitory computer-readable medium configured to store instructions; and
at least one processor configured to execute the instructions to perform operations comprising:
deploying a webpage comprising a plurality of configurations, wherein the plurality of configurations exhibit different behaviors;
assigning one or more experiments to a traffic container configured to assign the plurality of configurations to incoming traffic, wherein assigning the one or more experiments includes:
determining current assignments of the one or more experiments; and
generating a message based on the current assignments and an indication that the one or more experiments will be reassigned;
accepting the incoming traffic for accessing the webpage;
randomly assigning:
a first subset of the incoming traffic to a first configuration,
a second subset of the incoming traffic to a second configuration,
a third subset of the incoming traffic to a third configuration, and
a fourth subset of the incoming traffic to a fourth configuration;
transmitting the webpage in one of the plurality of configurations based on the random assignments, wherein the first subset is mutually exclusive with the second subset but not with the third subset; and
obtaining one or more measurements indicative of relative performances of the plurality of configurations.

* * * * *